United States Patent [19]

Kirker, Jr.

[11] 3,841,642

[45] Oct. 15, 1974

[54] ROTARY MECHANICAL FLUID SEAL

[75] Inventor: Alton Everett Kirker, Jr., Narragansett, R.I.

[73] Assignee: Sealol, Inc., Warwick, R.I.

[22] Filed: May 28, 1971

[21] Appl. No.: 147,957

[52] U.S. Cl. ............................................... 277/40
[51] Int. Cl. ......................... F16j 15/40, F16j 15/54
[58] Field of Search ...... 277/40, 39, 86, 87, DIG. 9, 277/207

[56] References Cited
UNITED STATES PATENTS

| | | | |
|---|---|---|---|
| 2,626,839 | 1/1953 | Creson et al.................... | 277/207 X |
| 2,889,159 | 6/1959 | Jensen ................................. | 277/40 |
| 3,245,692 | 4/1966 | Voitik.................................. | 277/40 |
| 3,552,752 | 1/1971 | Lojukutz............................. | 277/40 |
| 3,578,344 | 5/1971 | Yost..................................... | 277/40 |
| 3,689,083 | 9/1972 | Greenawalt.......................... | 277/40 |

Primary Examiner—Samuel B. Rothberg
Attorney, Agent, or Firm—William Frederick Werner; Ralph L. Cadwallader

[57] ABSTRACT

A rotary mechanical fluid seal for use in high pressure and/or high temperature environments, comprising a unitary structure adapted to cooperate with a rotating member and consisting of a housing having an inner shell with a shaft opening, a primary sealing ring having a sealing face engageable with a rotating member and slidably mounted in said housing, a secondary sealing ring, fabricated from semi-resilient material, slidably engaging said primary sealing ring in fluid tight relationship and slidably engaging a spacing collar fastened to said housing in lateral fluid tight relationship.

2 Claims, 8 Drawing Figures

PATENTED OCT 15 1974

INVENTOR.
ALTON EVERETT KIRKER, JR.
BY
William Frederick Werner
ATTORNEY

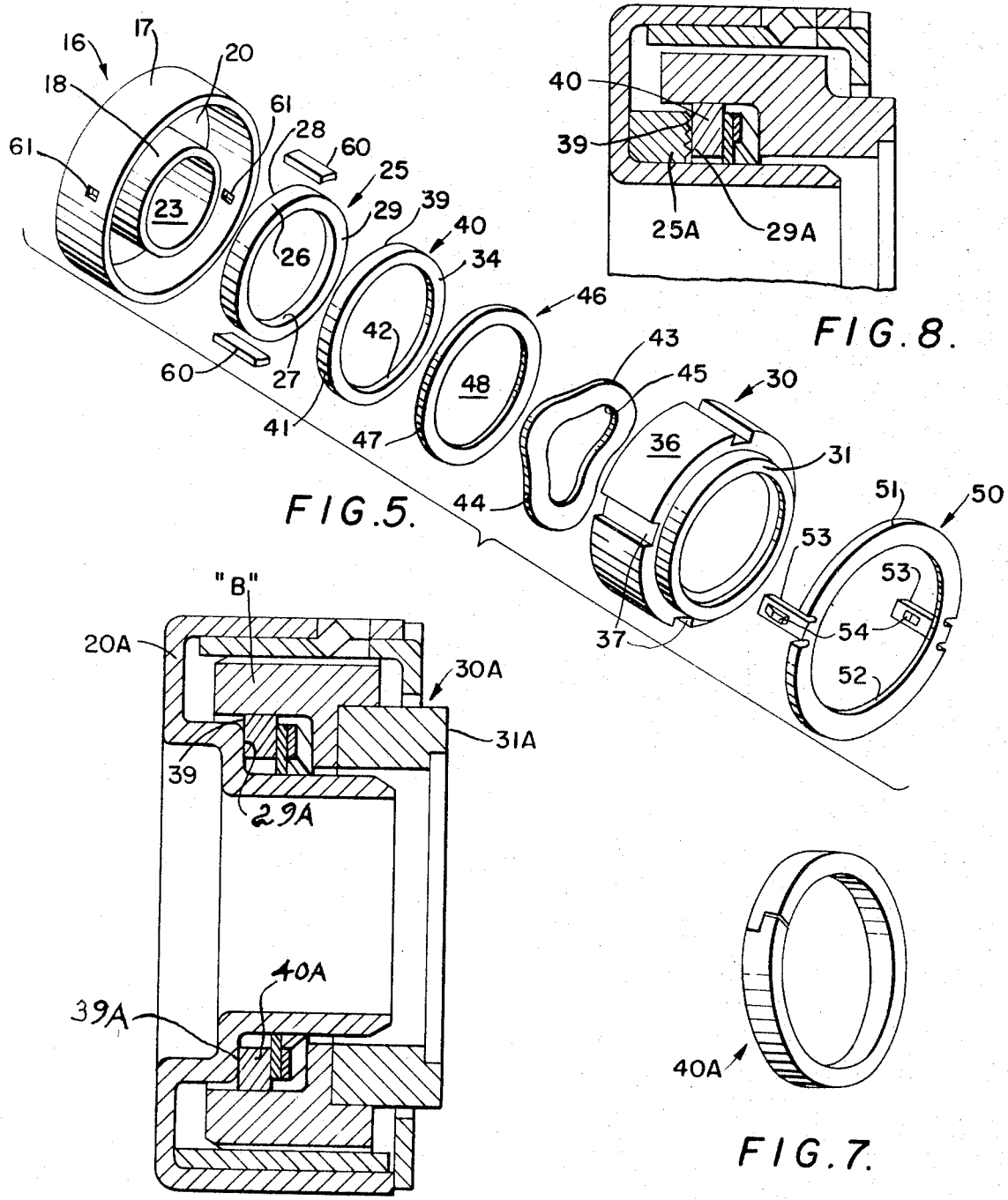

ROTARY MECHANICAL FLUID SEAL

The present invention is concerned with rotary mechanical fluid seals of the type used for effecting a fluid tight seal between a rotating sealing ring and a stationary sealing face, and more particularly with the secondary sealing element used to separate the high pressure chamber from the low pressure chamber.

An object of the present invention is to provide a secondary sealing element in a rotary mechanical fluid seal which will effectively function in extremely high temperatures.

Another object of the present invention is to provide a rotary mechanical fluid seal with novel structural features, so that, the several parts may be assembled from parts fabricated from a variety of materials, and in this manner, the seal will function in a wide variety of fluid environments.

And still another object of the present invention is to provide a rotary fluid seal for use with very high fluid pressure, be the fluid, liquid or gas, which is economical to manufacture, yet durable and reliable in use.

In environments where fluids are pumped or otherwise circulated it has long been a practice to seal the rotary shaft which is a part of the pumping or circulating apparatus by utilizing a mechanical seal.

Commonly, the shaft extends from the zone of the fluid to a zone outwardly therefrom in the atmosphere and for rather obvious reasons, excessive fluid flow across the shaft from the fluid zone to the atmospheric zone is undesirable.

The aforementioned mechanical seals, conventionally, take the form of a rotary member supported on the rotating shaft. The rotary member is provided with a mating face which serves to form a fluid tight joint between a stationary element and the rotating member.

The stationary element is normally fixed in the pump housing and is provided with a secondary sealing element which forms a fluid tight joint between the housing and the stationary element. The present invention is directed to the secondary sealing element.

In the past this secondary sealing element took the form of an O-ring, or other packing held in a circular groove. Fluid pressure, acting upon the O-ring, distorted the O-ring into fluid tight sealing position.

With the advent of very high temperatures, the synthetic material of the O-ring disintegrated. Groove type packing has also failed to function as a fluid seal in a high temperature environment.

Accordingly, it is an object of the present invention to provide a secondary sealing element which will maintain sealing efficiency as the environmental temperature increases and functions effectively at ambient pump starting temperatures.

Other objects of the present invention will be pointed out in part and become apparent in part in the following specification and claims.

Like reference numerals refer to like parts in the accompanying drawings in which:

FIG. 5 is an exploded perspective view of the secondary sealing elements per se.

FIG. 6 is a view similar to FIG. 3, illustrating a modified form of secondary sealing element.

FIG. 7 is a perspective view of a modified form of secondary sealing element ring.

FIG. 8 is a fragmentary, enlarged view in cross section of another form of secondary sealing element.

Figure 2:
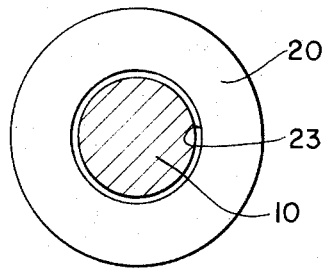
FIG. 2 is a left end view thereof.
Figure 1:
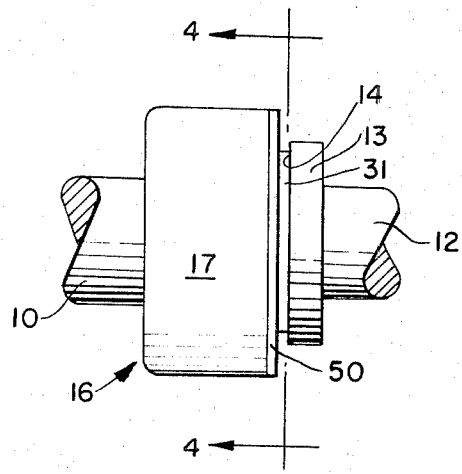
FIG. 1 is a side elevational view of the new and improved rotary mechanical fluid seal unit adapted to be fixed in a housing.
Figure 3:
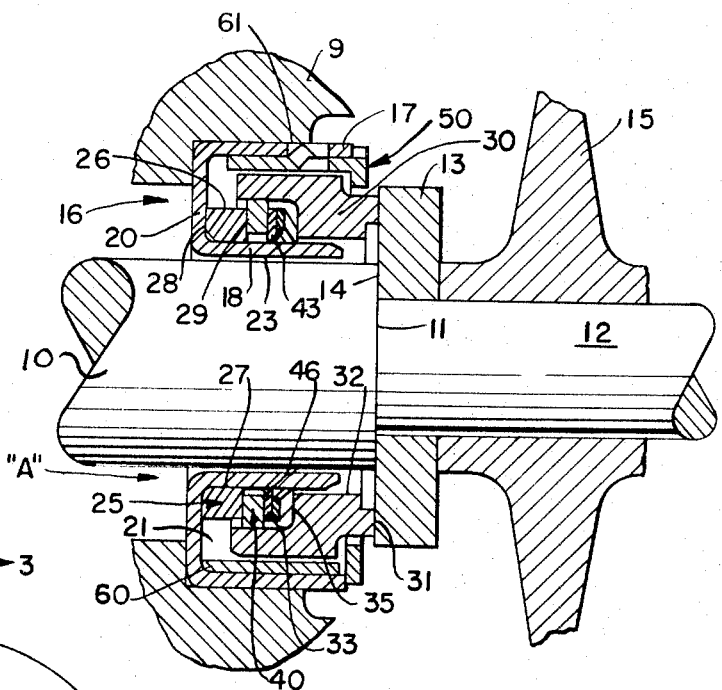
FIG. 3 is a vertical cross sectional view, taken along line 3—3 of FIG. 4, with the housing and pump impeller added and fragmentarily illustrated.

In proceeding with this invention reference is directed to the drawings, wherein is illustrated the present rotary mechanical fluid seal supported in a pump casing 9 and surrounding a pump shaft 10 (see FIG. 3). The shaft 10 may be provided with a shoulder 11 and a reduced diameter 12. A rotary member 13 provided with a mating face 14 is fixed to the reduced diameter 12, as by a drive fit, and abutts shoulder 11. A pump impeller 15 may be fixed to shaft 10.

Figure 4:
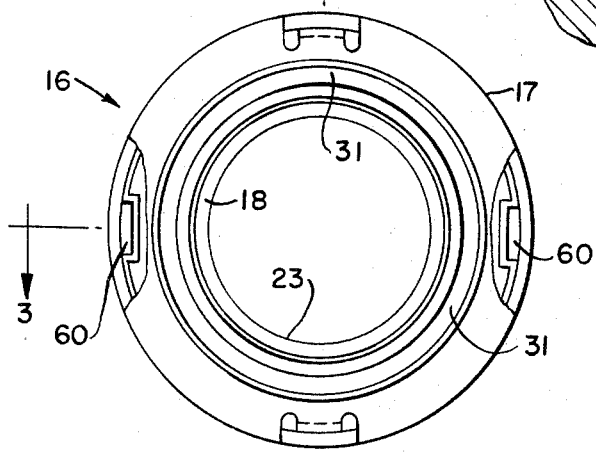
FIG. 4 is a right end view taken on line 4—4 of FIG. 1 looking in the direction of the arrows.

The new and improved rotary mechanical fluid seal (see FIGS. 3, 4 and 5) comprises a cylindrical outer housing, generally indicated by reference numeral 16, consisting of an outer shell 17, an inner shell 18 and a back wall 20 integrally connected to both the outer shell 17 and inner shell 18 to provide a chamber 21. Inner shell 18 forms a shaft opening 23 through which shaft 10 freely passes.

One or more lugs 60, shown as two in number, are welded to outer shell 17 and project into chamber 21. Outer shell 17 is also provided with detent slots 61.

A spacing collar, generally indicated by reference numeral 25 having an outside diameter 26, an inside diameter 27, a rear surface 28 and front surface 29 is fastened to inner shell 18 by means of a "drive fit" with rear surface 28 abutting back wall 20. The "drive fit" provides a fluid tight seal between inside diameter 27 and inner shell 18.

A primary sealing ring, generally indicated by reference numeral 30, is provided with a forwardly protruding annular sealing face 31, an axial bore 32, a circular recess 33 having a vertical wall 35 and an enlarged outside surface 36 having a plurality of diametrical slots 37.

A secondary sealing ring 40 is provided with an outside surface 41, an inside surface 42, a rear surface 39 and a front surface 34. A circular wave spring 43 is provided with a circumference 44 and an axial opening 45. A back up washer 46 is provided with an outside surface 47 and a circular opening 48. A retaining ring 50 is provided with an outside surface 51, a central opening 52 and a plurality of prongs 53 having detent projections 54.

In assembling the several parts, back up washer 46 is placed in circular recess 33 and abutting secondary sealing ring 40 with outside surface 47 spaced away from circular recess 33 to allow for outward thermal expansion of washer 46. Circular wave spring 43 is placed in circular recess 33 abutting wall 35 and back up washer 46 with circumference 44 spaced away from circular recess 33. Secondary sealing ring 40 is placed in circular recess 33 and is provided with an outside surface 41 larger in diameter than the diameter of circular recess, 33 thereby, to provide a "squeeze fit" and a fluid tight seal between outside surface 41 and a circular recess 33. This "squeeze fit" however, provides for relative sliding movement between circular recess 33 and outside surface 41.

The several parts are placed in chamber 21 with rear surface 39 abutting front surface 29 on spacing collar 25 in fluid tight relationship. Retaining ring 50 through central opening 52 is placed over forwardly protruding annular sealing face 31, with prongs 53, and lugs 60 located in diametrical slots 37. Detent projections 54 removably engage detent slots 61 to removably fasten ring 50 to housing 16 to thereby provide a unitary mechanical fluid seal ready for shipment and installation in a pump housing.

Outer shell 17 is removably secured in pump casing 9. The rotary member 13 is driven upon reduced diameter 12 abutting shoulder 11 to provide a fluid tight seal between rotary member 13 and reduced diameter 12.

In this arrangement, circular wave spring 43 exerts a sidewise or axial thrust in opposite directions. Spring 43 abutting wall 35 and back up washer 46 urges rear surface 39 into fluid tight position against front surfaces 29, thereby to urge sealing face 31 into fluid tight position against mating face 14.

It will be observed, that primary fluid tight sealing takes place at the rotary mating face 14 and stationary sealing face 31, an interface relationship old in the art, while a new structural type of secondary fluid tight sealing is provided by the sealing ring 40 in cooperation with spacing collar 25.

Fluid flowing in the direction of arrow "A" in FIG. 3 passes between shaft opening 23 and the outside surface of shaft 10 so as to pass between axial bore 32 and the outside surface of shaft 10.

Interfaces 14, 31 prevent the fluid from passing therebetween. Outside surface 41 in fluid tight relation with circular recess 33 prevent fluid passing therebetween. Front surface 29 and interface rear surface 39 prevent fluid passing therebetween. And the drive fit of diameter 27 and inner shell 18 prevent fluid passing therebetween.

The present secondary fluid seal structural arrangement permits the several parts to be fabricated from an infinite variety of materials or combinations of materials. This constitutes an advantageous improvement over the heretofore rather limited choice of materials available to seal manufacturers and pump users, enabling them to design long-life secondary seals specifically for operation in high temperature, high pressure or corrosive fluid environments.

FIG. 7 discloses a piston ring type of secondary sealing ring 40A which may be substituted for secondary sealing ring 40. Ring 40A may be fabricated from resilient material and functions in the same manner as an automobile piston ring.

FIG. 6 is a modified form of construction in which primary sealing ring 30A comprises an annular sealing face 31A fabricated from a pre-selected material which is fastened to the body "B" of the sealing ring. Back wall 20A is deformed as shown to provide a front surface 29A against which rear surface 39 is yieldingly held in fluid tight relationship. In this manner spacing coller 25 is eliminated. In all other structural features, sealing ring 30A is the same as sealing ring 30.

FIG. 8 is still another modified form of construction in which front face 29A of spacing collar 25A is provided with a serrated surface so that front face 29A engages rear surface 39 in fluid tight relationship. This is desirable when secondary sealing ring 40 is fabricated from material having uncomplimentary fluid tight mating characteristics with the spacing collar 25A material.

In other structural features the structure shown in FIG. 8 is the same as the structure shown in FIG. 3.

Having shown and described preferred embodiments of the present invention, by way of example, it should be realized that structural changes could be made and other examples given without departing from either the spirit or scope of this invention.

What I claim is:

1. A rotary mechanical fluid seal, adapted to cooperate with a rotating member, consisting of a housing having an inner shell provided with a shaft opening, a spacing collar having a front surface, means fastening said spacing collar to said inner shell in fluid tight relationship, a primary sealing ring provided with a sealing face, a circular recess, a wall and an axial bore, means slidably fastening said primary sealing ring to said housing, a secondary sealing ring having an outside surface and a rear surface, means slidably engaging said outside surface with said circular recess in fluid tight relationship, spring means interposed between said wall and said secondary sealing ring urging said rear surface into engagement with said front surface in fluid tight relationship, in which said means slidably fastening said primary sealing ring to said housing consists of an outer shell having a pair of lugs fastened to said outer shell, said sealing ring being provided with a plurality of slots said pair of lugs slidably engaing a pair of slots selected from said plurality of slots to removably fasten said sealing ring to said housing said housing having a pair of detent slots, a retaining ring having a central opening, a pair of prongs, with each prong having a detent projection, said sealing ring face projecting through said central opening with said pair of prongs located in a pair of slots selected from said plurality of slots and with said detent projections removably engaging said detent slots to thereby provide a unitary structure.

2. A rotary mechanical fluid seal for controlling the leakage of a pressurized fluid comprising a housing, a shaft extending through the housing, a rotary member, having a mating face, fixed to the shaft, a cylindrical outer housing consisting of an outer shell, an inner shell, and a back wall integrally connected to both the outer shell and inner shell to provide a chamber, said inner shell having a shaft opening through which said shaft passes, a spacing collar having an inside diameter, and a front surface, means fastening said spacing collar to said inner shell in fluid tight relationship, a primary sealing ring provided with a forwardly protruding annular sealing face, an axial bore, a circular recess and a wall perpendicular to said axial bore, and an enlarged outside surface having a plurality of diametrical slots, a back up washer having an outside surface and a circular opening; said washer located in said circular recess and abutting said wall with said circular opening surrounding said inner shell, a circular wave spring having an axial opening surrounding said inner shell and abutting said back up washer, a secondary sealing ring having an outside surface, an inside surface and a rear surface, located in said circular recess with said outside surface engaging said circular recess with a "squeeze fit" and with said rear surface engaging said front surface in fluid tight relationship, said circular wave spring urging said forwardly protruding annular sealing face into fluid tight relationship with said mating face, and a retaining ring having diametrical prongs slidably engaging said diametrical slots, and detent means on said prongs removably securing said prongs to said housing.

* * * * *